United States Patent [19]

Goodman

[11] Patent Number: 4,544,360

[45] Date of Patent: Oct. 1, 1985

[54] BOOK REFERENCE LIST

[76] Inventor: Joseph Goodman, 39, Hillside Ct., Finchley Rd., London, England, NW3

[21] Appl. No.: 627,434

[22] Filed: Jul. 3, 1984

[30] Foreign Application Priority Data

Jul. 8, 1983 [GB] United Kingdom ............... 8318474

[51] Int. Cl.⁴ .............................................. G09B 1/06
[52] U.S. Cl. ..................................... 434/178; 434/348
[58] Field of Search ............... 434/178, 346, 348, 349, 434/161, 199, 405, 427, 430, 433, 322, 327, 40/489, 490, 491

[56] References Cited

U.S. PATENT DOCUMENTS 736,140 8/1903 Nicholl .............................. 434/433
3,224,112 12/1965 Hanson ........................... 434/348 X

FOREIGN PATENT DOCUMENTS 530555 12/1940 United Kingdom .
1252752 11/1971 United Kingdom .
1287675 9/1972 United Kingdom .
1409248 10/1975 United Kingdom .

OTHER PUBLICATIONS

Xerox Disclosure Journal, vol. 1, No. 3, p. 1, Mar. 1976, 434-346.

Primary Examiner—William H. Grieb
Attorney, Agent, or Firm—Lerner, David, Littenberg, Krumholz & Mentlik

[57] ABSTRACT

A reference list for use with a book comprises a plurality of information bearing lines which are initially masked and are progressively unmasked as the book is read. This provides a progressive index which may in the case of a narrative provide a list of characters as a memory aid or in the case of a teaching book it may provide the answers only to the questions previously attempted.

7 Claims, 6 Drawing Figures

FIG. 4.

BOOK REFERENCE LIST

The present invention relates to a book reference list.

BACKGROUND OF THE INVENTION

The memorizing of characters in books and their relationship to one another presents a difficulty to readers, especially when some characters appear early in the narrative and do not reappear for some considerable time, by which time the reader has forgotten their status, i.e. relationship to other characters, or their occupation or profession.

A further difficulty is presented in differentiating between similar names as would be the case with stories involving members of the same family bearing the same surnames. Fiction books do not have indexes as these would reveal characters before their appearance in the narrative, thereby defeating the object of the plot by revealing what is intended to remain covert.

To resolve these problems, some few readers are wont to list characters in their order as revealed in the story and progressively complete the list while reading the book. Most readers presented with these not uncommon problems, resort to searching previous chapters for a reference to a forgotten character, a lengthy and not always successful operation which also detracts from the fluency of the narrative.

Another occasion in which a progressive reference list is required is for books in which questions are set for the reader. It is quite common for a book to call upon the reader to test his understanding of one section or chapter before proceeding to the next. Usually the answers are contained in the back of the book but when referring to answers it is difficult not to see the answers to questions yet to be encountered in the text and this can defeat the purpose of the questions.

It is an object of the present invention to overcome these disadvantages and to provide the reader with a selective reference list which does not reveal information regarding parts of the book which have yet to be encountered by the reader.

SUMMARY OF THE PRESENT INVENTION

According to the present invention in its broadest aspect, there is provided a reference list for use with a book, comprising a sheet having inscribed thereon information related to the contents of the book, which information is arranged in the same order as the corresponding parts of the book, and masking means overlying the information and adapted to be removed by the reader as required so as to provide a reference index in which only information relating to parts of the book already read is revealed.

In a first particular aspect of the invention, there is provided a memory aid for use with a book, comprising a sheet having inscribed thereon an index of characters arranged in their order of appearance in the book and masking means overlying the names of the characters and adapted to be removed individually so as to provide an index only for the characters previously encountered while reading the book.

In a second particular aspect of the invention, there is provided an answer sheet for use with a teaching book containing a plurality of questions, the answer sheet having inscribed thereon the answers to the questions in the order in which they appear in the book and masking means overlying the answers and adapted to be removed individually so as to reveal only the answers to questions previously encountered while studying the book.

Preferably, the reference list, be it a memory aid or an answer sheet, comprises a sheet of text retained within a separate holder having transparent pockets in which there are removably received opaque strips constituting the masking means, each strip overlying a line of information, i.e., the particulars of a respective character or the answer to a question.

In this case, strips would be removed by the reader from the pockets sequentially as the different characters or questions are encountered. To permit the same holder to be re-used by a subsequent reader or with a list applicable to a different book, a further pocket may be provided for the storage of the removed strips so that they may be re-inserted into their respective pockets prior to subsequent use.

The reference list may be constituted by one of the pages of the book, preferably as an end leaf, which may, if desired, be perforated to facilitate its removal from the book, the list being inserted by the reader into the holder. If a long reference list is necessary, the information may extend over both sides of the sheet and the reader on having removed the final strip would reinsert the strips into their respective pockets, the strips having been stored, if desired, in a further pocket provided in the rear of the holder. The user may then reverse the sheet and recommence with the second side of the sheet, during which time the first side of the sheet would be revealed on the reverse side of the holder.

As is known, paperback covers have in recent years become very elaborate and costly productions, many with high quality multicolour printing, embossing, raised metallic lettering, plasticised protective covering, etc. It is unusual, however, to find printing on the inside covers. It is thus possible for a progressive reference list to be produced on the inside cover or covers of such books and become an integral part of it.

Since an average paperback has some forty five lines of print, excluding headings, a list of twenty to twenty five lines could readily be printed on the inside cover of such a book. If more than this number is required to be listed, both front and back covers could be used.

Thus in a preferred embodiment of the present invention the holder is sized to slidingly engage and fit over a book cover and the information bearing lines are printed on the inside of the said cover to be masked and unmasked by the strips upon positioning of the holder on the cover. The holder when used in this manner will also provide a protective covering to the book.

The holder may alternatively be designed to retain a separate sheet, either provided with the book or purchased separately, whereupon the holder may serve additionally as a bookmark.

In a further embodiment of the invention, the masking means for the information may be adhered to an information bearing sheet instead of being part of a separate holder. For example, self adhesive strips may be placed over the information lines to be peeled off individually by the user. As a further alternative, the information sheet may be painted over with an opaque paint capable of being scratched off to reveal the information printed beneath. In this case, it is desirable to print over the self adhesive strips or the paint to indicate which part of the masking means is to be removed as a page is encountered.

Stouter material is recommended, such as a card, in this embodiment to enable removal of the masking means without damage to the information bearing sheet. Because in this case the reference list is not re-usable, it may be desirable to provide several cards with each book so that the book may be passed on to a new reader.

The reference list is intended to give the reader an updated handy reference at any given stage in the book. For fictional works, it can provide a brief resume of the narrative thus far if a lengthy interval of time elapses between having reached the bookmarked page and the re-commencing of reading.

BRIEF DESCRIPTION OF THE DRAWINGS

The invention will now be described further, by way of example, with reference to the accompanying drawings, in which:

FIG. 4 is a schematic representation of the information-carrying sheet inside the holder, with some of the masking strips partially withdrawn.

DESCRIPTION OF A PREFERRED EMBODIMENT

Figure 1:
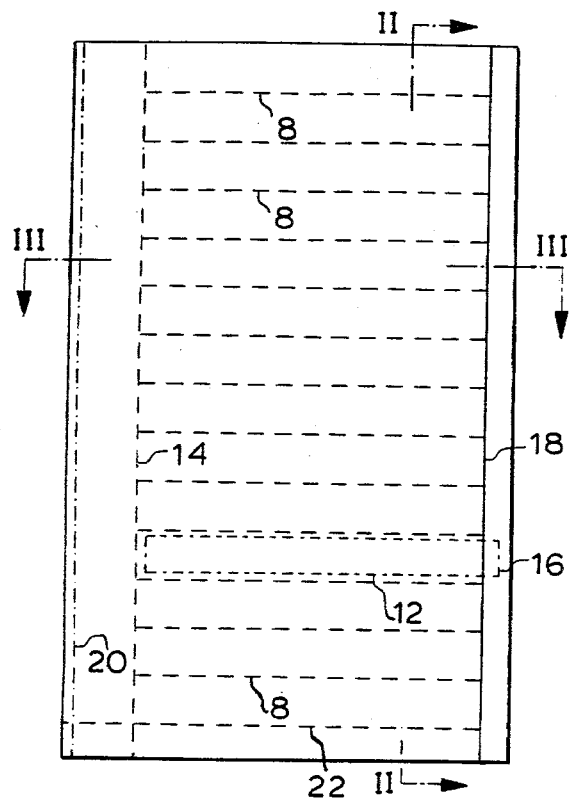
FIG. 1 is a general view of the holder according to the invention, with the dashed lines representing welding seams.
Figure 2:
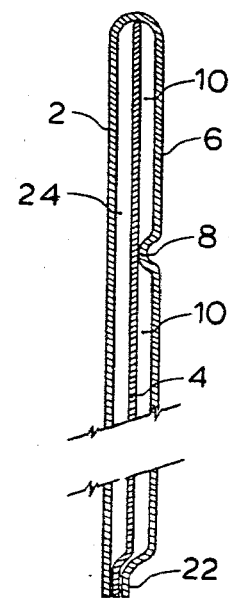
FIG. 2 is a cross-sectional view, to an enlarged scale along plane II—II of the holder of FIG. 1.
Figure 3:
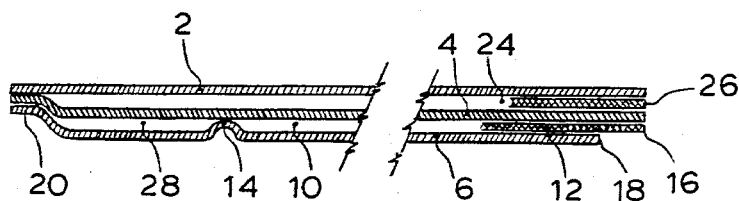
FIG. 3 is a cross-sectional view, to an enlarged scale along plane III—III of the holder of FIG. 1.

Referring now to the drawings, there is shown in FIGS. 1 to 3 a holder of a progressive index according to a first embodiment of the invention, consisting of a three-layer structure comprising a bottom layer 2, an intermediate layer 4 and a top layer 6. The three layers are made from relatively thin, transparent plastics material such as polyethylene, P.V.C. or the like. In the embodiment as illustrated the bottom layer 2 and the top layer 6 consist of one single, folded piece of material. However, the holder can be made of three distinct, separate pieces.

In manufacturing the holder, the first step consists of thermally "stitching" the intermediate layer 4 and the top layer 6 together by means of the horizontal welding seams 8 that define the width of the thus produced pockets 10 into which fit slidingly the masking strips 12 shown ghosted-in in FIG. 1 and in FIG. 3, and the vertical seam 14 that delimits the depth of the pockets 10. The length of the strips 12 exceeds the depth of the pockets 10 so that even when the strips are inserted into the pockets 10 as far as they will go, i.e., right up to the seam 14, their free end 16 will slightly project beyond the edge 18 of the pocket 10 to facilitate manipulation.

As a final step, the bottom layer 2 is joined to the already joined intermediate and top layers 4 and 6. In the illustrated embodiment this is effected by two additional welding seams, a vertical seam 20 and a horizontal seam 22 that also delimits the lowermost pocket 10.

If the bottom layer 2 and the top layer 6 are made of separate pieces, an additional horizontal seam 22 is of course required at the top edge of the holder. The seams 20 and 22 have now also defined a compartment 24 into which slidingly fits a sheet 26 on which there is printed the information relevant to the book, for example the list of characters appearing in the book. This sheet can also be constituted by either or both, covers of paperbacks, in which case the information is printed on the inside of these covers.

The pocket 28 formed between the vertical welding seams 20 and 14 has no use, its two walls 4 and 6 merely providing visual access to the column of page numbers of the sheet 26 when the latter is introduced into its compartment 24. In alternative embodiments, the horizontal welding seams 8 may be extended up to the vertical seam 20, altogether dispensing with pocket 28.

Embodiments are also envisaged in which a sheet 26 is introduced into the compartment 24 not from the side as in the embodiment of FIG. 1, but from below, in which case the compartment 24 must be open below and closed at both vertical edges.

The masking strips 12 are opaque and made of a material stiff enough to prevent buckling when the strip, held at a point close to its free end, is pushed into the pocket 10.

Figure 4:
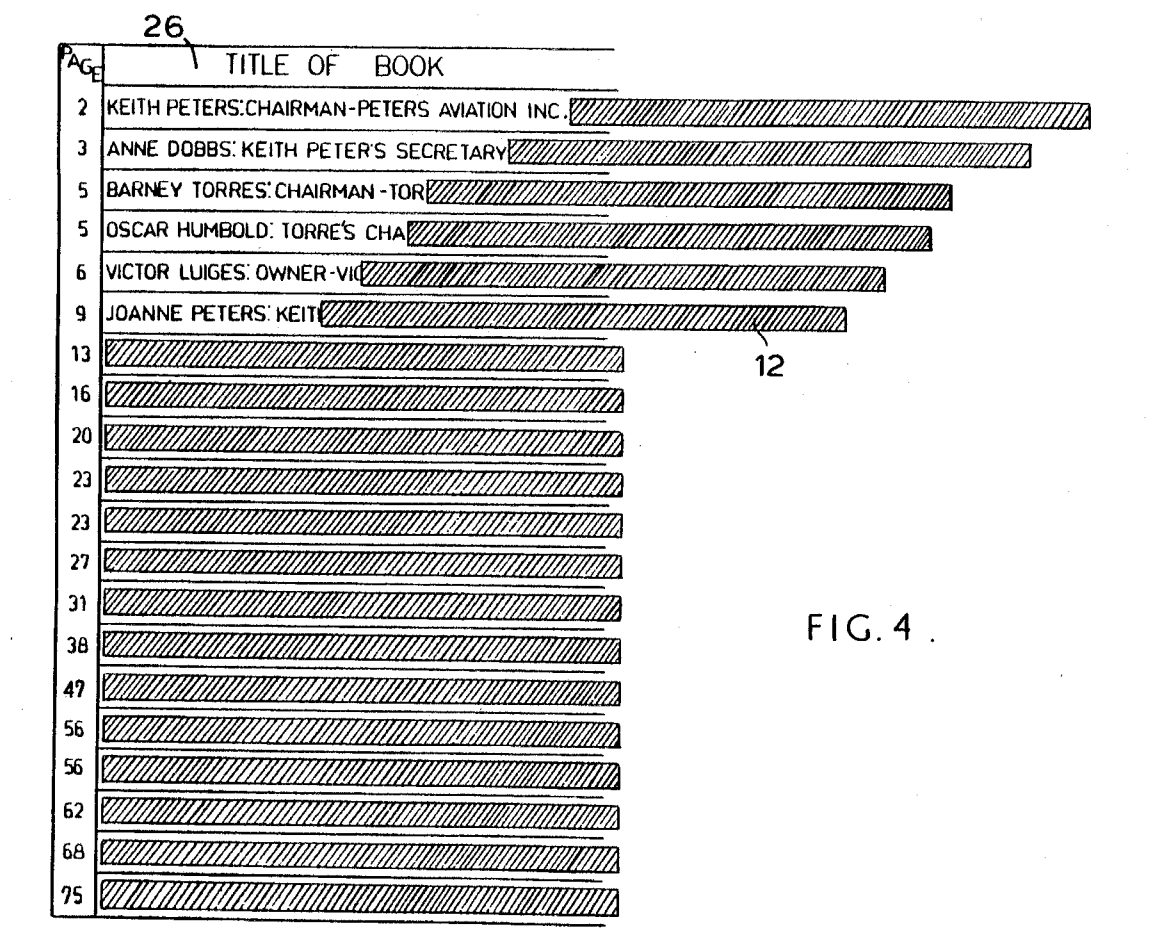

FIG. 4 is a schematic representation of the progressive index with part of the information printed on the sheet 26 revealed by some of the opaque strips 12 that have been partly pulled out.

Figures 5, 6:
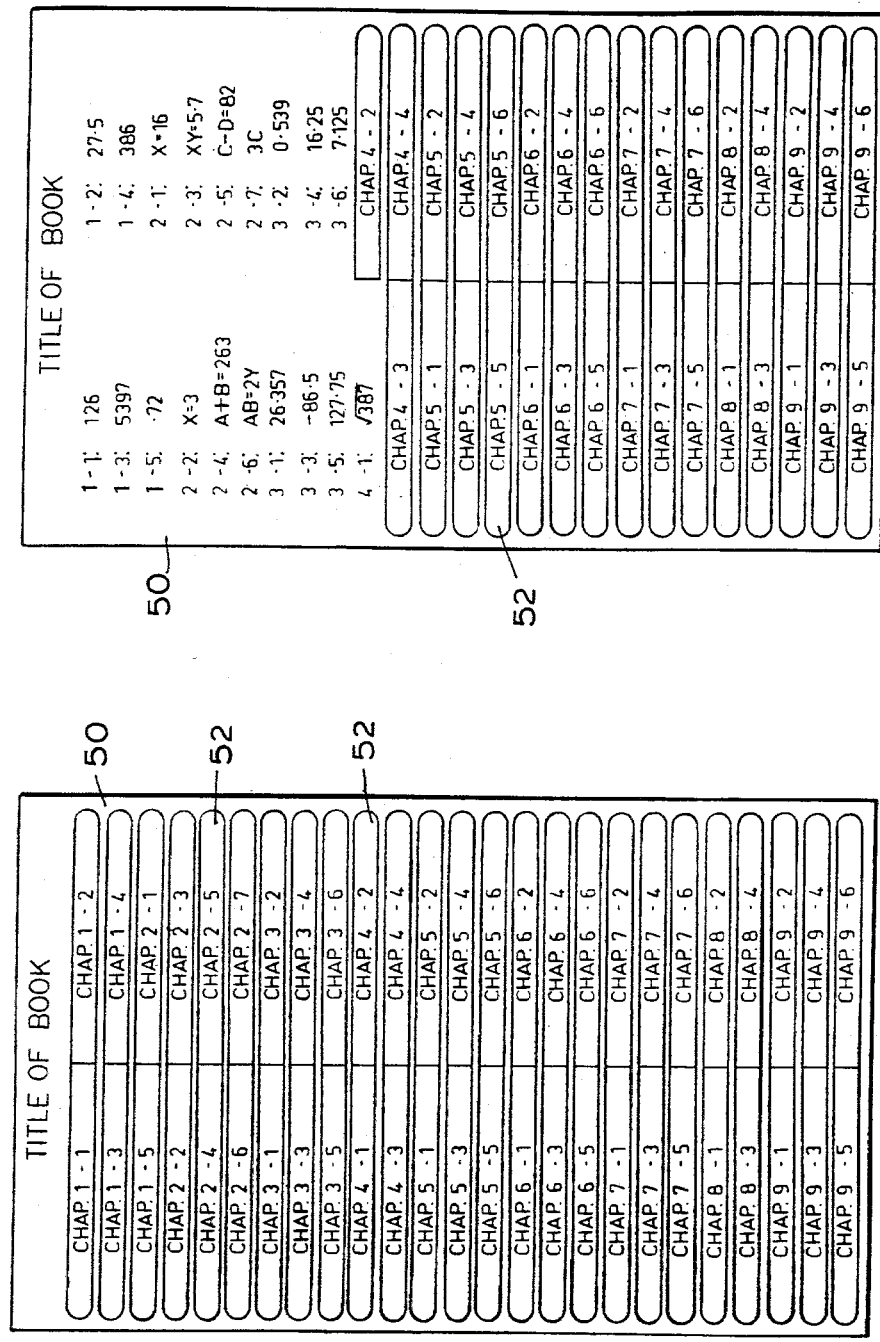
FIG. 5 is a schematic representation of a progressive index of a further embodiment of the invention.
FIG. 6 shows the index of FIG. 5 with some of the masking strips removed.

In the embodiment of FIGS. 5 and 6, the reference index is constituted by a card 50 onto which there are adhered several strips 52 which can be peeled off without impairing the print beneath them. FIG. 6 differs from FIG. 5 in that some of the strips have been shown peeled off.

Each strip 52 is overprinted with information to indicate the related part of the book. As the reader reaches the relevant part, the appropriate strip is peeled off to reveal the required information, the example illustrated showing answers to mathematical questions posed in the text of the book.

I claim:

1. A memory aid for use with a book, comprising:
a sheet having inscribed thereon information related to the contents of the book, which information is arranged in a predetermined sequence,
a holder having transparent pockets, said holder retaining said sheet, and
masking means including opaque strips removably receivable in said transparent pockets, each strip overlying a line of information and adapted to be removed by the reader as required so as to provide a memory aid in which only information relating to parts of the book already read is revealed.

2. A memory aid as claimed in claim 1, wherein said inscribed information includes an index of characters arranged in their order of appearance in the book, said masking means overlying the names of the characters and adapted to be removed individually so as to provide an index only for the characters previously encountered while reading the book.

3. A memory aid as claimed in claim 1, wherein said inscribed information includes the answers to questions in the order in which they appear in the book, said masking means overlying the answers and adapted to be removed individually so as to reveal only the answers to questions previously encountered while studying the book.

4. A memory aid as claimed in claim 1, wherein said holder includes a further pocket for the storage of the removed strips so that they may be re-inserted into their respective pockets prior to reuse.

5. A memory aid as claimed in claim 1, wherein said sheet includes one of the pages of the book which is inserted by the user into said holder while the sheet remains attached to the book.

6. A memory aid as claimed in claim 1, wherein said sheet includes the inside of the cover of the book and said holder is slipped over the cover of the book, said holder serving additionally as a protective cover for the book.

7. A memory aid as claimed in claim 1, wherein said sheet is separable from the book, said holder being capable of serving as a bookmark.

* * * * *